(12) United States Patent
Xia et al.

(10) Patent No.: US 8,165,595 B2
(45) Date of Patent: Apr. 24, 2012

(54) SYSTEM AND METHOD FOR MULTI-STAGE ANTENNA TRAINING OF BEAMFORMING VECTORS

(75) Inventors: Pengfei Xia, Mountain View, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 737 days.

(21) Appl. No.: 12/264,100

(22) Filed: Nov. 3, 2008

(65) Prior Publication Data
US 2009/0189812 A1 Jul. 30, 2009

Related U.S. Application Data

(60) Provisional application No. 61/023,802, filed on Jan. 25, 2008.

(51) Int. Cl.
H04W 72/00 (2009.01)
(52) U.S. Cl. ............................... 455/452.2; 455/562.1
(58) Field of Classification Search ............... 455/452.2, 455/454, 19, 24, 25, 226.1–226.4, 63.4, 562.1
See application file for complete search history.

(56) References Cited

U.S. PATENT DOCUMENTS

| | | | |
|---|---|---|---|
| 5,955,991 A | 9/1999 | Kawakubo | |
| 6,181,276 B1 * | 1/2001 | Schlekewey et al. | 342/372 |
| 6,590,532 B1 | 7/2003 | Ogawa et al. | |
| 6,721,908 B1 | 4/2004 | Kim et al. | |
| 6,731,689 B2 | 5/2004 | Dogan | |
| 6,795,392 B1 | 9/2004 | Li et al. | |
| 6,847,832 B2 | 1/2005 | Wong et al. | |
| 6,937,189 B2 | 8/2005 | Kim | |
| 7,013,165 B2 | 3/2006 | Yoon et al. | |
| 7,039,370 B2 | 5/2006 | Laroia et al. | |
| 7,161,534 B2 | 1/2007 | Tsai et al. | |
| 7,239,893 B2 | 7/2007 | Yang | |

(Continued)

FOREIGN PATENT DOCUMENTS
EP 1 267 501 A2 12/2002
(Continued)

OTHER PUBLICATIONS

Butler et al., "Beam-Forming Matrix Simplifies Design of Electronically Scanned Antennas." Electronic Design, Apr. 12, 1961, pp. 170-173.

(Continued)

*Primary Examiner* — Jean Gelin
*Assistant Examiner* — Michael Nguyen
(74) *Attorney, Agent, or Firm* — Kenneth L. Sherman, Esq.; Michael Zarrabian, Esq.; Sherman & Zarrabian LLP (57) ABSTRACT

A system and method for multi-stage antenna training of beamforming vectors is disclosed. In one embodiment, the method comprises a method of acquiring a beamforming pattern in a wireless communication system, the method comprising receiving a first plurality of signals having different transceiver sector patterns, measuring first indicators of link quality corresponding to the first plurality of signals, selecting at least one transceiver sector pattern based on the first indicators of link quality, receiving a second plurality of signals having different transceiver beam patterns, each transceiver beam pattern associated with the selected at least one transceiver sector pattern, measuring second indicators of link quality corresponding to the second plurality of signals, and selecting at least one transceiver beam pattern based on the second measures of link quality.

38 Claims, 6 Drawing Sheets

U.S. PATENT DOCUMENTS

| | | | |
|---|---|---|---|
| 7,312,750 | B2 | 12/2007 | Mao et al. |
| 7,342,535 | B2 | 3/2008 | Ann et al. |
| 7,450,659 | B2 | 11/2008 | Corredoura et al. |
| 7,640,462 | B2 | 12/2009 | Lin |
| 2002/0122498 | A1 | 9/2002 | Dogan |
| 2002/0147032 | A1 | 10/2002 | Yoon et al. |
| 2003/0201936 | A1 | 10/2003 | Kim |
| 2004/0008614 | A1* | 1/2004 | Matsuoka et al. ............ 370/203 |
| 2004/0218581 | A1 | 11/2004 | Cattaneo |
| 2005/0037799 | A1* | 2/2005 | Braun et al. ................. 455/525 |
| 2005/0068231 | A1 | 3/2005 | Regnier et al. |
| 2005/0206564 | A1 | 9/2005 | Mao et al. |
| 2005/0276347 | A1 | 12/2005 | Mujtaba et al. |
| 2006/0012520 | A1 | 1/2006 | Tsai et al. |
| 2006/0104382 | A1 | 5/2006 | Yang et al. |
| 2006/0183503 | A1* | 8/2006 | Jeffrey Goldberg ......... 455/561 |
| 2006/0234645 | A1 | 10/2006 | Lin et al. |
| 2006/0248429 | A1 | 11/2006 | Grandhi et al. |
| 2006/0279460 | A1* | 12/2006 | Yun et al. ...................... 342/377 |
| 2007/0037528 | A1* | 2/2007 | Doan et al. .................... 455/101 |
| 2007/0189412 | A1 | 8/2007 | Xia et al. |
| 2007/0205943 | A1 | 9/2007 | Nassiri-Toussi et al. |
| 2007/0249402 | A1* | 10/2007 | Dong et al. ................. 455/562.1 |
| 2008/0094281 | A1* | 4/2008 | Teng et al. .................... 342/368 |
| 2008/0101493 | A1 | 5/2008 | Niu et al. |
| 2008/0108390 | A1 | 5/2008 | Yoon et al. |
| 2008/0134254 | A1 | 6/2008 | Xia et al. |
| 2008/0144751 | A1 | 6/2008 | Xia et al. |
| 2008/0204319 | A1 | 8/2008 | Niu et al. |
| 2008/0285667 | A1* | 11/2008 | Mondal et al. ................ 375/260 |
| 2009/0033555 | A1 | 2/2009 | Niu et al. |
| 2009/0046010 | A1 | 2/2009 | Niu et al. |
| 2009/0046012 | A1 | 2/2009 | Niu et al. |
| 2009/0047910 | A1 | 2/2009 | Niu et al. |
| 2009/0058724 | A1 | 3/2009 | Xia et al. |
| 2009/0121935 | A1 | 5/2009 | Xia et al. |
| 2009/0160707 | A1* | 6/2009 | Lakkis .......................... 342/367 |
| 2009/0193300 | A1 | 7/2009 | Xia et al. |
| 2009/0238156 | A1 | 9/2009 | Yong et al. |
| 2010/0009635 | A1 | 1/2010 | Qin et al. |

FOREIGN PATENT DOCUMENTS

| | | |
|---|---|---|
| JP | 2004/140642 A2 | 5/2004 |
| KR | 2000/0071545 A | 11/2000 |
| KR | 2001/0015765 | 2/2001 |
| KR | 10-2001-0018995 A | 3/2001 |
| KR | 10-2002-0022109 A | 3/2002 |
| KR | 2006/0068921 A | 6/2006 |
| WO | WO 01/017131 | 3/2001 |
| WO | WO 03/090386 A1 | 10/2003 |

OTHER PUBLICATIONS

Buzzi S. et al., Performance of iterative data detection and channel estimation for single-antenna and multiple-antennae wireless communications, IEEE Transactions on Vehicular Technology, Jul. 2004, 53(4): 1085-1104.

Gaetano, Lianne, SiBEAM—60 GHz Architecture for Wireless Video Display, SiBEAM, Inc. White Paper, Mar. 2006, [Available online: http://www.sibeam.com/whtpapers/60_GHz_forWirelessHD_3_06.pdf], pp. 1-6.

Coffey, S. et al., "Joint Proposal: High throughput extension to the 802.11 Standard: PHY" IEEE 802.11-05/1102r4, draft proposal, Jan. 2006, pp. 1-82.

De Los Santos, "MEMS-Based Microwave Circuits and Systems, Introduction to Microelectromechanical (MEM) Microwave Systems," Artech House, p. 167-168 and 193, 1999.

Furrer et al., Bounds on the ergodic capacity of training-based multiple-antenna systems, Proceedings, Internal Symposium on Information Theory, ISIT, Sep. 2005, p. 780-784.

Hachman, "CE Giants back Amimon's Wireless HDTV Tech," online: www.pcmag.com, 1 page, Jul. 23, 2008.

Hansen, R.C., Phased Array Antennas, John Wiley and Songs, New York, 1998, pp. 1-507.

Hitachi et al., High-Definition Multimedia Interface (HDMI) Specifications version 1.2, Aug. 22, 2005, pp. 1-214.

IEEE 802.11 Working Group of the 802 Committee, "Draft Amendment to Standard for Information Technology-Telecommunications and information exchange between systems-Local and metropolitan are networks—Specific requirements—Part 11: Wireless LAN Medium Access Control (MAC) and Physical Layer (PHY) specifications: Enhancements for Higher Throughput," IEEE P802.11n/D1.0, Mar. 2006, pp. 1-335.

IEEE 802.15.3 Working Group. Part 15.3: Wireless medium access control (MAC) and physical layer (PHY) specifications for high rate wireless personal area networks (WPANs). IEEE Draft Standard, Draft P802.15.3/D16, Sep. 2003, pp. 1-324.

LG Electronics Inc., VVirelessHD Specification Version 1.0 Overview, Oct. 9, 2007, 77 pages.

Lin et al., Error Control Coding - Fundamentals and Applications, 2nd Edition, Pearson Prentice Hall, 2004, Chapter 16, pp. 774-780.

NEC develops compact millimeter-wave transceiver for uncompressed HDTV signal transmission, NE Asia Online, Apr. 5, 2005, (Downloaded from http://neasia.nikkeibp.com/topstory/000913 on Sep. 29, 2006).

Niu et al., "Beamforming for Space-Time Coded IEEE 802.11n System with Known Fading Correlations," in Proceeding of 39th Asilomar Conference on Signals, Systems and Computers, Pacific Grove, CA, Nov. 2005.

Project: IEEE P802.15 Working Group for Wireless Personnel Area Networks (WPANs), Presentations, Nov. 12, 2006 & Jan. 15, 2008, pp. 1-64.

Razavi, B., "Challenges in Portable RF Transceiver Design." Circuits & Devices, 8755-3996/96, IEEE, Sep. 1996, pp. 12-24.

Rye et al., On Quadratic Inverses for Quadratic Permutation Polynomials Over Integer Rings, IEEE Trans. On Information Theory, Mar. 2006, 52(3): 1-12.

Scintera, "Advanced Signal Processing Platform," Scintera Networks, Sep. 2003, pp. 1-9.

Stüber, G. et al., "Broadband MIMO-OFDM Wireless Communications", Proceedings of the IEEE, vol. 92, No. 2, Feb. 2004, pp. 271-294.

Takeshita et al., On Maximum Contention-Free Interleavers and Permutation Polynomials Over Integer Rings, IEEE Trans. On Information Theory, Mar. 2006, 52(3): 1-13.

Van Veen et al., Beamforming: A Versatile Approach to Spatial Filtering, IEEE ASSP Magazine, Apr. 1988, 5(2): 4-24.

International Search Report and Written Opinion dated Aug. 28, 2009 for PCT/KR2009/000365, filed Jan. 23, 2009.

International Search Report dated Sep. 16, 2009 for PCT Application No. PCT/KR2009/00576, filed Feb. 6, 2009.

U.S. Office Action dated Jun. 23, 2008 in U.S. Appl. No. 11/890,207, filed Aug. 2, 2007.

U.S. Office Action dated Nov. 24, 2008 in U.S. Appl. No. 11/890,207, filed Aug. 2, 2007.

U.S. Advisory Action dated Mar. 2, 2009 in U.S. Appl. No. 11/890,207, filed Aug. 2, 2007.

U.S. Office Action dated Apr. 6, 2009 in U.S. Appl. No. 11/890,207, filed Aug. 2, 2007.

U.S. Office Action dated Jul. 25, 2008 in U.S. Appl. No. 11/881,978, filed Jul. 30, 2007.

U.S. Office Action dated Jan. 2, 2009 in U.S. Appl. No. 11/881,978, filed Jul. 30, 2007.

U.S. Notice of Allowance dated Sep. 15, 2009 in U.S. Appl. No. 11/881,978, filed Jul. 30, 2007.

U.S. Office Action dated Sep. 24, 2009 in U.S. Appl. No. 11/899,286, filed Sep. 5, 2007.

U.S. Notice of Allowance dated Jan. 21, 2010 in U.S. Appl. No. 11/899,286, filed Sep. 5, 2007.

U.S. Office Action dated Oct. 15, 2009 in U.S. Appl. No. 11/706,942, filed Feb. 13, 2007.

U.S. Non-Final Office Action for U.S. Appl. No. 12/264,111 mailed Mar. 15, 2011.

The International Search Report dated Jun. 29, 2009 for corresponding PCT Application No. PCT/KR2009/000373.

* cited by examiner

SYSTEM AND METHOD FOR MULTI-STAGE ANTENNA TRAINING OF BEAMFORMING VECTORS

CROSS-REFERENCE TO RELATED APPLICATIONS

This application claims the benefit under 35 U.S.C. §119(e) of U.S. Provisional Application No. 61/023,802, filed on Jan. 25, 2008, which is incorporated by reference in its entirety. This application is related to a copending application entitled SYSTEM AND METHOD FOR ANTENNA TRAINING OF BEAMFORMING VECTORS BY SELECTIVE USE OF BEAM LEVEL TRAINING, application Ser. No. 12/362,407, which has been filed on Jan. 29, 2009, the entire disclosure of which is hereby incorporated by reference.

BACKGROUND

1. Field

This invention relates to beamforming in wireless communication systems.

2. Description of the Related Technology

A wireless communication network is commonly associated with a telecommunications network where the interconnections among the communication devices are implemented without the use of wires. Wireless telecommunications networks are generally implemented with some type of remote information transmission system that uses electromagnetic waves, such as radio waves, for the carrier and this implementation usually takes place at the physical layer of the network.

A wireless personal area network (WPAN) is one type of wireless network used for communication among a plurality of devices, such as computers, mobile phones, personal digital assistants, printers, digital cameras, televisions, media players, etc. Usually, a WPAN covers a short range up to 10 or 20 meters. A number of standards for such short-range network communications have recently been developed, including, but not limited to, Bluetooth and IEEE 802.15.

In some communications systems, such as a WPAN, beamforming can be used at both the transmitter and the receiver. Antenna arrays are often used at both ends of such systems, and need to be trained before the payload is transmitted. However, antenna training introduces unwanted overhead, as it can be a time-consuming process in which no data of interest, such as audio or video data, is transmitted. It is desirable in any communication system to minimize or reduce the amount of overhead.

Further, as a WPAN involves wireless communication, movement of the devices within the network is not hindered by the connection of wires. However, movement of the devices or changes in the environment may disrupt communications between devices by changing the characteristics of the channel between them. Accordingly, there is a need for a method of maintaining reliable transmission and reception in a wireless network, such as a WPAN, without introducing unsatisfactory amounts of overhead.

SUMMARY OF CERTAIN INVENTIVE ASPECTS

One aspect of the development is a method of acquiring a beamforming pattern in a wireless communication system, the method comprising receiving a first plurality of signals having different transceiver sector patterns, measuring first indicators of link quality corresponding to the first plurality of signals, selecting at least one transceiver sector pattern based on the first indicators of link quality, receiving a second plurality of signals having different transceiver beam patterns, each transceiver beam pattern associated with the selected at least one transceiver sector pattern, measuring second indicators of link quality corresponding to the second plurality of signals, and selecting at least one transceiver beam pattern based on the second measures of link quality.

Another aspect of the development is a method of acquiring a beamforming pattern, the method comprising transmitting a first plurality of signals having different transmitter sector patterns, receiving a first selection signal indicative of a selection of at least one transceiver sector pattern, transmitting a second plurality of signals having different transmitter beam patterns, each transceiver beam pattern associated with the selected at least one transceiver sector pattern, and receiving a second selection signal indicative of a selection of at least one transceiver beam pattern.

Another aspect of the development is a system for acquiring a beamforming pattern in a wireless communication system, the system comprising a receiver configured to receive a first plurality of signals having different transceiver sector patterns, a measuring module configured to measure first indicators of link quality corresponding to the first plurality of signals, and a selecting module configured to select at least one transceiver sector pattern based on the first indicators of link quality, wherein the receiver is further configured to receive a second plurality of signals having different transceiver beam patterns, each transceiver beam pattern associated with the selected at least one transceiver sector pattern, wherein the measuring module is further configured to measure second indicators of link quality corresponding to the second plurality of signals, and wherein the selecting module is further configured to select at least one transceiver beam pattern based on the second measures of link quality.

Another aspect of the development is a system for acquiring a beamforming pattern in a wireless communication system, the system comprising a transmitter configured to transmit a first plurality of signals having different transmitter sector patterns, and a receiver configured to receive a first selection signal indicative of a selection of at least one transceiver sector pattern, wherein the transmitter is further configured to transmit a second plurality of signals having different transmitter beam patterns, each transceiver beam pattern associated with the selected at least one transceiver sector pattern, and wherein the receiver is further configured to receive a second selection signal indicative of a selection of at least one transceiver beam pattern.

Another aspect of the development is a system for acquiring a beamforming pattern in a wireless communication system, the system comprising means for receiving a first plurality of signals having different transceiver sector patterns, means for measuring first indicators of link quality corresponding to the first plurality of signals, means for selecting at least one transceiver sector pattern based on the first indicators of link quality, means for receiving a second plurality of signals having different transceiver beam patterns, each transceiver beam pattern associated with the selected at least one transceiver sector pattern, means for measuring second indicators of link quality corresponding to the second plurality of signals, and means for selecting at least one transceiver beam pattern based on the second measures of link quality.

Another aspect of the development is a programmable storage device comprising code which, when executed, causes a processor to perform a method of acquiring a beamforming pattern in a wireless communication system, the method comprising transmitting a first plurality of signals having different transmitter sector patterns, receiving a first selection signal indicative of a selection of at least one transceiver sector pattern, transmitting a second plurality of signals having different transmitter beam patterns, each transceiver beam pattern associated with the selected at least one transceiver sector pattern, and receiving a second selection signal indicative of a selection of at least one transceiver beam pattern.

Another aspect of the development is a method of acquiring a beamforming pattern in a wireless communication system, the method comprising receiving a first plurality of signals having different transceiver beam patterns, each transceiver beam pattern associated with a particular transceiver sector pattern, measuring first indicators of link quality corresponding to the first plurality of signals, selecting a first transceiver beam pattern based on the first measures of link quality, detecting a channel change, receiving, after detecting a channel change, a second plurality of signals having different transceiver beam patterns, each transceiver beam pattern associated with the particular transceiver sector pattern, measuring second indicators of link quality corresponding to the second plurality of signals, and selecting a second transceiver beam pattern from a plurality of said transceiver beam patterns based on the second measures of link quality.

Another aspect of the development is a method of acquiring a beamforming pattern, the method comprising transmitting a first plurality of signals having different transmitter beam patterns, each transceiver beam pattern associated with a particular transceiver sector pattern, receiving a first selection signal indicative of a selection of a first transceiver beam pattern, detecting a channel change, and transmitting, in response to detection of a channel change, a second plurality of signals having different transmitter beam patterns, each transmitter beam pattern associated with the particular transceiver sector pattern.

Another aspect of the development is a method of constructing a multi-level codebook, the method comprising determining a plurality of transceiver sector patterns, including a first transceiver sector pattern, determining a plurality of first transceiver beam patterns, each first transceiver beam pattern associated with the first transceiver sector pattern, and storing the plurality of transceiver sector patterns and plurality of first transceiver beam patterns as a multi-level codebook.

DETAILED DESCRIPTION OF THE CERTAIN INVENTIVE EMBODIMENTS

Certain embodiments provide a method and system for acquiring a beamforming pattern in a wireless network. The following detailed description is directed to certain sample embodiments of the invention. However, the invention can be embodied in a multitude of different ways as defined and covered by the claims. In this description, reference is made to the drawings wherein like parts are designated with like numerals throughout.

WPAN System Overview

A wireless personal area network (WPAN) system is a computer network used in communication between devices (for example, telephones and personal digital assistants) that are located close to an individual. The devices may or may not belong to that individual. The reach of a WPAN is typically a few meters, but may be more under certain circumstances. A WPAN may be used to communicate between the devices, or to interconnect with a higher level network such as the internet. A number of standards for network communications have recently been developed, including, but not limited to, Bluetooth and IEEE 802.15.

As a WPAN involves wireless communication, movement of the devices within the network is not hindered by the connection of wires, however, movement of the devices or changes in the environment may disrupt communications between devices by changing the characteristics of the channel between them. Accordingly, there is a need for a method of maintaining reliable transmission and reception in a wireless network, such as a WPAN, without introducing satisfactory amounts of overhead.

Figure 1:
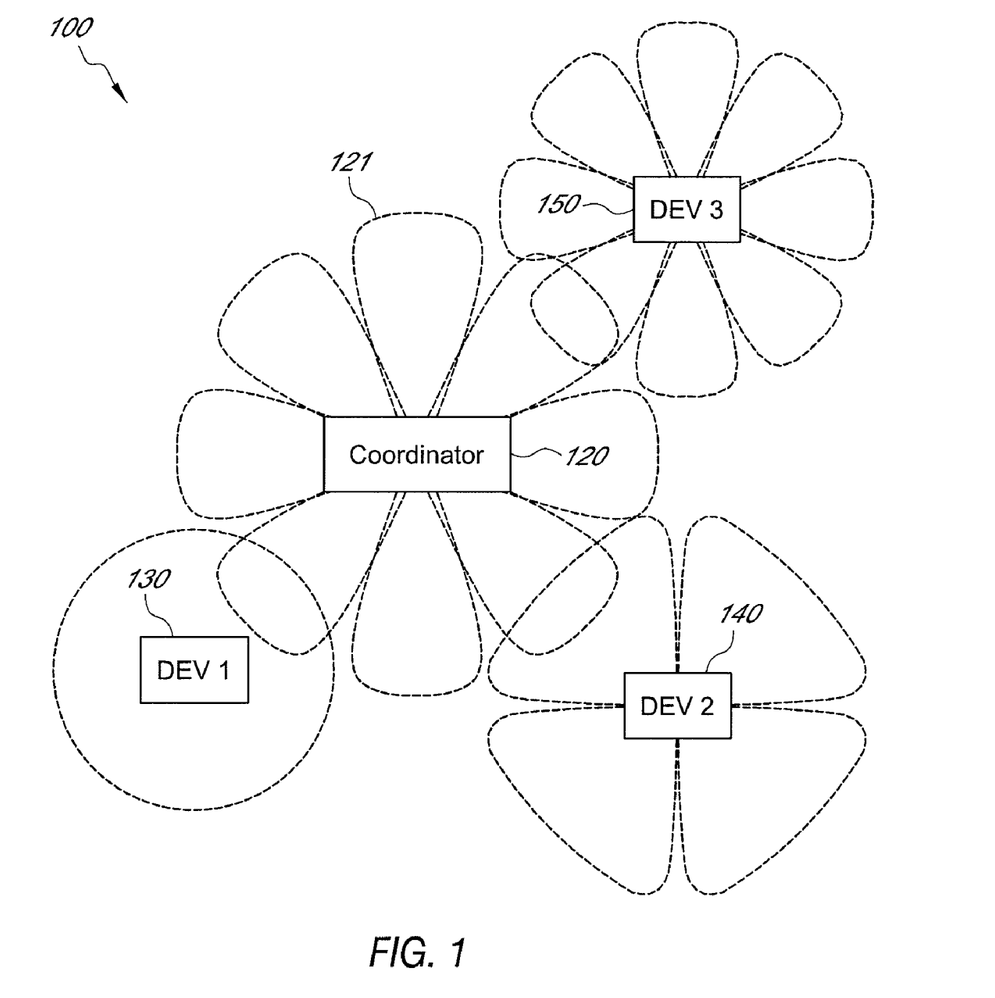
FIG. 1 is a diagram of a wireless network between wireless devices having a variety of directional and omni-directional antennae.

FIG. 1 is a diagram of an exemplary wireless personal area network which maintains reliable transmission and reception in response to events such as device movement and changes in the environment, according to one embodiment. The illustrated network 100 includes a coordinator 120 and first to third devices 130, 140, 150, respectively. The coordinator 120 and the first to third devices 130, 140, 150 may communicate using a variety of different parameters, including different modulation and coding schemes, different protocols, different random access schemes, and different frequency bands.

The coordinator 120 may be responsible for coordinating data transfer between itself and other devices. The coordinator 120 may partition a wireless channel into a number of time periods and schedule communication between specific devices during those time periods. The coordinator may be, for example, a television, a set-top box, a personal computer, a laptop computer, or a dedicated controlling box.

In the network 100 of FIG. 1, the coordinator 120 is configured to perform directional transmission and/or reception with the first to third devices 130, 140, 150. The coordinator 120 may utilize sector antennas or an antenna array for the directional transmission and/or reception. When a sector antenna, such as a horn antenna, is used, each sector 121 represents a different direction along an axis away from the coordinator 120 which can be used for transmission or reception of data. The coordinator 120 selects a sector and, while the sector is selected, is able to transmit or receive data in a general direction defined by the shape of the sector. When an antenna array, such as a linear array or a circular array, is used, each direction is determined by the antenna beamforming coefficients, as is known to those skilled in the art and described below.

The first device 130 may utilize omni-directional transmission and reception. The second device 140 may utilize a sectored antenna with more or less sectors than the coordinator 120. In addition, the third device 150 may utilize a sector antenna with the same number of sectors as the coordinator 120. Each of the first to third devices 130, 140, 150 can be, for example, a television, a desktop computer, a laptop computer, a set-top box, a DVD player or recorder, a VCR, an audio player, a digital camera, a camcorder, a game device, or a computer peripheral such as a mouse, a keyboard, a printer, or a scanner.

In directional transmission, beamforming may also be used by either the coordinator 120 or one or more of the devices. In some embodiments, an asymmetric antenna system (AAS) may be employed by either the coordinator or one or more of the devices, resulting in different sets of transmission and reception directions.

Figure 2:
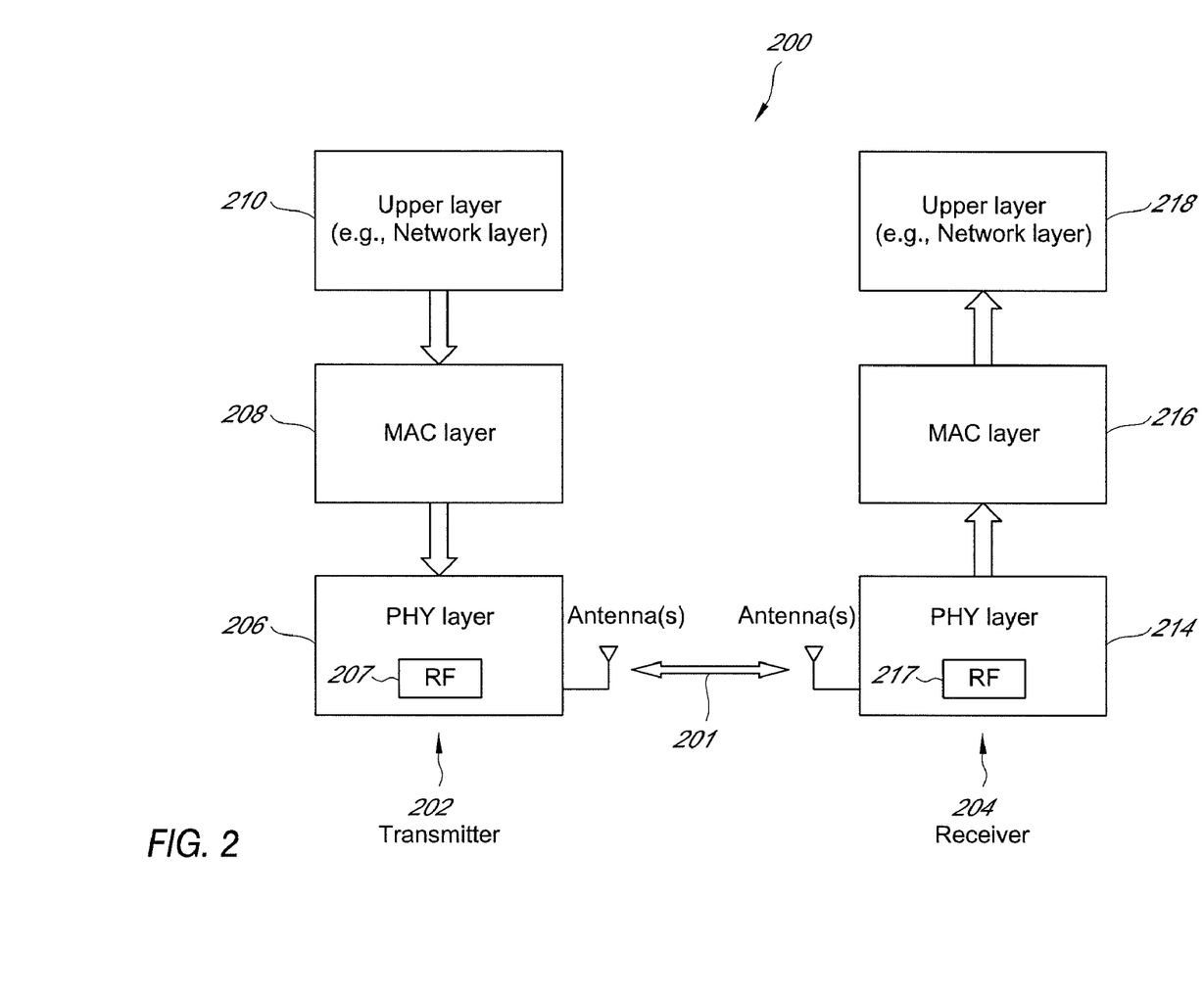
FIG. 2 is a functional block diagram illustrating an exemplary communication system for transmission of data over a wireless medium, according to one embodiment.

FIG. 2 shows a generalized block diagram illustrating an example wireless personal area network (WPAN) system 200. The example WPAN system 200 includes a wireless transmitter 202 and wireless receiver 204. The transmitter 202 includes a physical (PHY) layer 206, a media access control (MAC) layer 208, an upper layer 210, and one or more antennas. Similarly, the receiver 204 includes a PHY layer 214, a MAC layer 216, an upper layer 218, and one or more antennas. In some embodiments, the PHY layers 206, 214 include radio frequency (RF) modules 207, 217. The PHY layers 206, 214 provide wireless communication between the transmitter 202 and the receiver 204 via the RF modules 207, 217 and the one or more antennas through a wireless medium 201.

The upper layers 210, 218 represent one or more layers that are above the MAC layers 208, 216, respectively, and send command and/or data messages to the MAC layers. In certain embodiments (e.g., OSI or TCP/IP models), the upper layer 210, 218 includes a network layer. In certain embodiments, the network layer includes an IP protocol that performs the basic task of getting data packets from source to destination. In other embodiments (e.g., five-layer TCP/IP model), the upper layer 210, 218 further includes a transport layer and an application layer. In other embodiments, (e.g., seven-layer OSI model), the upper layer 210, 218, in addition to the transport layer and the application layer, further includes a session layer and a presentation layer.

In the wireless transmitter 202, the upper layer 210 provides data (e.g., text, graphics, or audio data) and/or command messages to the MAC layer 208. In certain embodiments, the MAC layer 208 can include a packetization module (not shown) which puts the data and/or command messages into the form of one or more data packets. The MAC layer 208 then passes the data packets to the PHY layer 206. The PHY/MAC layers of the transmitter 202 add PHY and MAC headers to the data packets. The PHY layer 206 transmits wireless signals including the data packets to the receiver 204 via the RF module 207 over the wireless channel 201.

In the wireless receiver 204, the PHY layer 214 receives the transmitted wireless signals including the data packets via the RF module 217. The PHY/MAC layers 214, 216 then process the received data packets to extract one or more data/command messages. The extracted data/command messages are passed to the upper layer 210 where the messages are further processed and/or transferred to other modules or devices to be displayed (text or graphics) or played (audio), for example.

General Beamforming

Transmit and/or receive beamforming has the potential of improving link quality substantially in wireless communications. For typical multiple-input/multiple-output (MIMO) systems, transmit and/or receiver beamforming are implemented in the digital domain, before a digital to analog conversion (DAC) operation at a transmitter side and after an analog-to-digital conversion (ADC) operation at a receiver side. The good performance of digitally beamformed systems comes at a cost of min(N, M) RF chains, where N is the number of transmitter antennas and M is the number of receiver antennas. The cost may become formidable, especially when the sampling frequency increases. When cost-effectiveness becomes a dominant system design issue, analog beamforming is more favorable, as it requires only 1 RF chain.

We next illustrate analog beamforming for MIMO OFDM (orthogonal frequency division multiplex) systems, while the same scheme can also be applied to MIMO single carrier modulated systems and other such variations. Suppose that K is the number of sub-carriers for OFDM modulation, N is the number of transmitter antennas, and M is the number of receiver antennas. Also, assume that the transmit beamforming vector is $$\vec{w} = [w_1, w_2, \ldots, w_N]^T$$

and the receive beamforming vector is $$\vec{v} = [v_1, v_2, \ldots, v_N]^T.$$

Also, let L+1 be the maximum number of multipath channel taps for each pair of transmit and receive antennas. Without loss of generality, it is reasonable to have K>>L+1 (i.e. the number of OFDM sub-carriers is much greater than the maximum number of multipath channel taps between any pair of transmitter and receiver antennas). Further, let $\vec{h}_{ij}=[h_{ij}(0)h_{ij}(1)h_{ij}(2)\Lambda h_{ij}(L)0\Lambda 0]^T$ be the multipath channel impulse between the ith receive and jth transmit antenna, appended with zeros such that each vector $\vec{h}_{ij}$ is of size K×1. There are altogether M×N such channel vectors, with each one corresponding to one transmit and receive antenna pair. Let S=diag($s_1, s_2, \ldots, s_K$) be a diagonal matrix containing all the K data sub-carriers in an OFDM system. Thus, the transmitted vector (over an OFDM symbol duration) on a jth transmitter antenna after beamforming is [$w_j s_1, w_j s_2, \ldots, w_j s_K$], for j=1, 2, ..., N. Because OFDM modulation diagonalizes the multipath channel, the received vector (over an OFDM symbol duration) on the ith receive antenna can be written as $$\vec{y}_i = \sum_{j=1}^{N} w_j S \vec{c}_{ij},$$

where $$\vec{c}_{ij} = F_K \vec{h}_{ij}$$

is the frequency channel response corresponding to the time-domain channel $\vec{h}_{ij}$, $w_j$ is the jth transmit beamforming coefficient, and $F_K$ is a K×K Fourier transform matrix.

At the receiver side, the received vectors $\vec{y}_i$ across all M receiver antennas will be combined by receive beamforming vectors $$\vec{v} = [v_1, v_2, \ldots, v_N]^T,$$

where $v_i$ is the ith receive beamforming coefficient. For this reason, the combined signal vector can be written as $$\vec{z} = \sum_{i=1}^{M} v_i \vec{y}_i = \sum_{i=1}^{M} v_i \sum_{j=1}^{N} w_j s \vec{c}_{ij} = s \sum_{i=1}^{M} v_i \sum_{j=1}^{N} w_j \vec{c}_{ij}$$

$$\vec{z} = s \sum_{i=1}^{M} v_i A_i \vec{w}$$

$$\vec{z} = sA\vec{v}$$

where the K×N matrix $A_i$ is defined as $$A_i = [\vec{c}_{i1}, \vec{c}_{i2}, \Lambda, \vec{c}_{iN}],$$

and the K×N matrix A is defined as $$A = \sum_{i=1}^{M} v_i A_i.$$

Similarly, the received signal vector can be written as $$\vec{z} = s \sum_{j=1}^{N} w_j \sum_{i=1}^{M} v_i \vec{c}_{ij}$$

$$\vec{z} = s \sum_{j=1}^{N} w_j B_j \vec{v}$$

$$\vec{z} = sB\vec{w}$$

where the K×M matrix $B_j$ is defined as $$B_j = [\vec{c}_{1j}, \vec{c}_{2j}, \Lambda, \vec{c}_{Mj}],$$

and the K×M matrix B is defined as $$B = \sum_{j=1}^{N} w_j B_j.$$

To optimize the transmit and receive beamforming vectors, one embodiment of the invention finds the transmit and receive beamforming vectors that jointly minimize the pairwise error probability (PEP) between two arbitrary information codes. Toward this objective, one embodiment of the invention solves the following two problems simultaneously:

maximize $\vec{v}^H B^H B \vec{v}$ subject to $\|\vec{v}\| = 1$ and maximize $\vec{w}^H A^H A \vec{w}$ subject to $\|\vec{w}\| = 1$.

Figure 3:
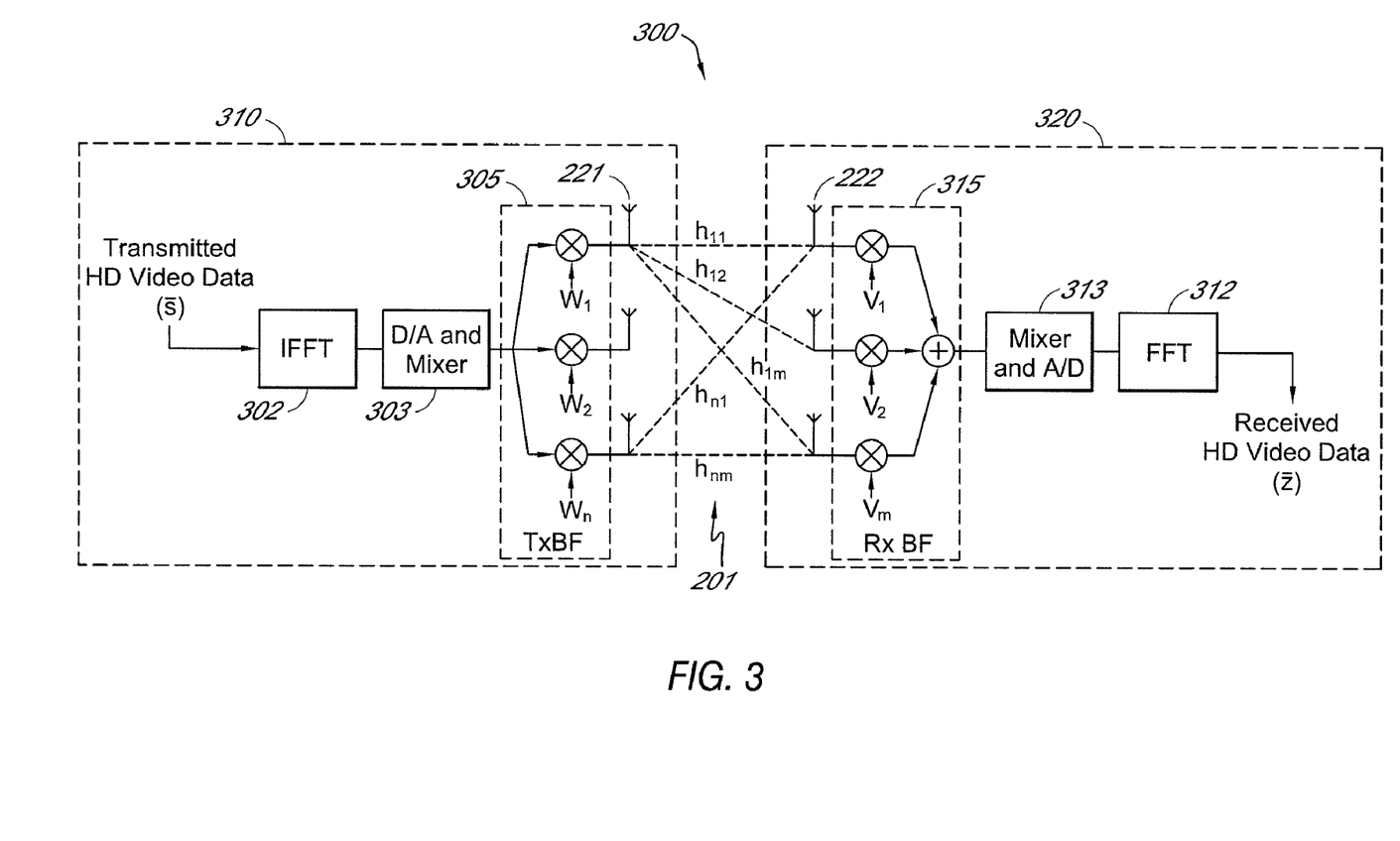
FIG. 3 is a schematic diagram illustrating an exemplary beamforming scheme of communication according to one embodiment.

It is noticed that the matrix A is dependent upon vector $\vec{w}$, while the matrix B is dependent upon vector $\vec{v}$. For this reason, the above two problems cannot be solved easily. FIG. 3 is a diagram demonstrating an exemplary beamforming scheme of MIMO OFDM system. The disclosed invention can also be applied to non-OFDM modulated schemes, such as single carrier modulated systems. In one embodiment, the system 300 is for the implementation of analog beamforming. The system 300 includes a transmitter 310 and a receiver 320. The transmitter 310 includes a module 302 for performing an inverse Fourier transform, a module 303 for performing digital-to-analog conversion and mixing, a transmitter beamformer 305, and transmitter antennas 221. The receiver 320 includes a module 312 for performing a Fourier transform, a module 313 for performing analog-to-digital conversion and mixing, a receiver beamformer 315, and receiver antennas 222. The transmitter 310 and receiver 320 perform beamforming in conjunction with each other.

On the transmitter side, data, denoted by the vector $\vec{s}$, is input into the system 300. In one embodiment, the data is uncompressed high definition video data. After an inverse Fourier transform (IFFT) 302, as well as digital-to-analog conversion and mixing 303, the modified data is input into the transmitter beamformer 305. The weights of the transmitter beamformer 305 are denoted by the variables $w_i$, for i=1, 2, . . . N, where N is the number of the transmitter antennas 221. After being weighted by the transmitter beamformer 305, the data is transmitted by the transmitter antennas 221 through the wireless channel 201, where it is received by the receiver antennas 222. The receiver beamformer 315 acts upon the received data to combine it. The weights of the receiver beamformer 315 are denoted by the variables $v_i$, for i=1, 2, . . . , M, where M is the number of the receiver antennas 222. After being processed by the receiver beamformer 315, the receiver data is input through the mixer and analog-to-digital converter 313. Also, a Fourier transform 312 is performed on the data to yield the OFDM-demodulated data 311, denoted by the vector $\vec{z}$.

Beamforming Vector Training

Selecting the weights of the beamformer can be done in a number of ways, including adaptive training or through selection of weight sets from a codebook, which is a collection of candidate beamforming patterns. Each candidate beamforming pattern of the codebook is a set of weights for each antenna of the beamformer that results in a specific beamforming pattern. In WPAN systems, codebooks can include 32 or 64 candidate beamforming patterns, meaning there are 32 or 64 directions in which the device implementing the codebook can transmit or receive data.

In one embodiment of the invention, there is a transmitter with $N_T$ antenna elements and the transmitter beamformer codebook size is $N_T \times N_1$, where $N_1$ is the number of candidate beamforming patterns of the transmitter. There is also a receiver with $N_R$ antenna elements and the receiver beamformer codebook size is $N_R \times N_2$, where $N_2$ is the number of candidate beamforming patterns of the receiver. The beamforming patterns at the transmitter are designated $A(1)$, $A(2), \ldots, A(N_1)$, whereas the beamforming patterns at the receiver are designated $B(1), B(2), \ldots, B(N_2)$.

One antenna training method works in a brute-force manner. According to this method, the transmitter exhaustively scans all possible $N_1$ beamforming patterns $A(1)$ through $A(N_1)$, while the receiver exhaustively scans all possible $N_2$ beamforming patterns $B(1)$ through $B(N_2)$ as well. Every combination of $A(i)$ and $B(j)$, for $i=1, \ldots, N_1$, $j=1, \ldots, N_2$, corresponds to a unique transceiver pattern. The amount of time to complete the training is related to $N_1 \times N_2 \times T$, where T is the dwell time for each transceiver pattern. In some embodiments, $N_1$ or $N_2$ is one. In such instances, the beamforming pattern for the transmitter or receiver may advantageously be omni-directional, but this is not always the case. Thus, a "transceiver beamforming pattern" can include a transmitter beamforming pattern, a receiver beamforming pattern, or both a transmitter beamforming pattern and a receiver beamforming pattern.

All the time used to train antennas is counted as overhead, since no information can be conveyed during this procedure. The overhead associated with brute-force antenna training may be substantial, especially if $N_1 \times N_2$ is large. At high frequencies, such as 60 GHz, this may be the case, since a very large antenna beamforming gain may be desired from the antenna array transceiver.

Another method and protocol disclosed herein involves a multi-stage approach. To enable this multi-stage approach, both transmitter and receiver may possess a multi-level codebook structure.

In one embodiment of the invention, a two-stage approach, each of the transmitter and the receiver has two sets of beamformer codebooks, with the first beamformer codebook being coarse in resolution, and the second beamformer codebook being fine in resolution. As used below, a "sector pattern" generally refers to a pattern of a first level which has a coarser resolution than a second level. The patterns of the second level are generally referred to below as "beam patterns." Further a "transceiver sector pattern" may include a transmitter sector pattern, a receiver sector pattern, or both a transmitter sector pattern and a receiver sector pattern. Likewise, a "transceiver beam pattern" may include a transmitter beam pattern, a receiver beam pattern, or both a transmitter beam pattern and a receiver beam pattern. In some embodiments, the first codebook, e.g., the sector codebook, is able to cover the entire space collectively, but this is not always the case. Similarly, in some embodiments, the second codebook, e.g., the beam codebook, is also able to cover the entire space collectively, but, again, this is not always the case.

Figure 4:
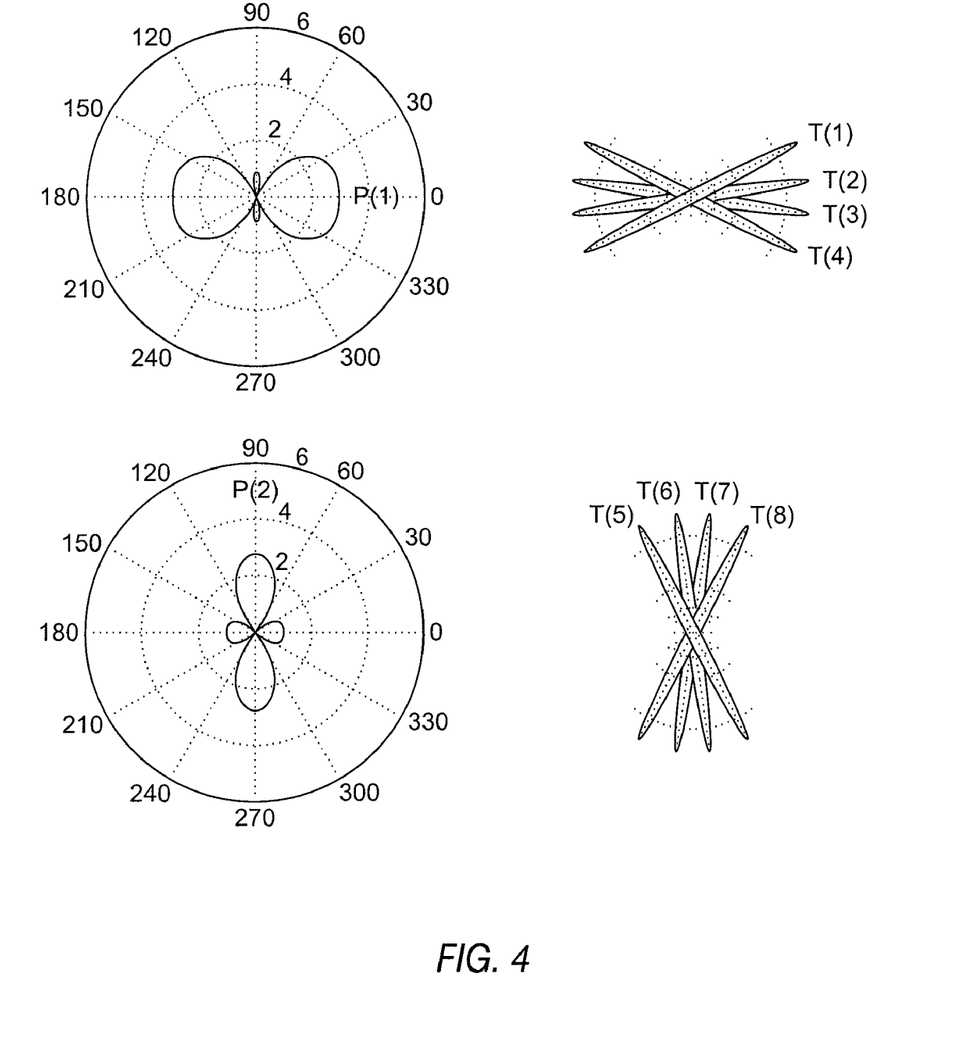
FIG. 4 is a diagram illustrating beamforming patterns which may be found in an exemplary two-stage codebook.

FIG. 4 is a diagram illustrating beamforming patterns that may be found in such a two-stage codebook for a transmitter or receiver. In the illustrated embodiment, a first beamformer codebook, denoted $C_1$, contains the two sector patterns $P(1)$ and $P(2)$, whereas a second beamformer codebook, denoted $C_2$, contains the eight beam patterns $T(1)$, $T(2)$, $T(3)$, $T(4)$, $T(5)$, $T(6)$, $T(7)$, and $T(8)$. Each codebook of the illustrated embodiment covers the entire space, but this is not necessarily the case in other embodiments. Each sector pattern in codebook $C_1$ has a similar coverage as a group of beam patterns in codebook $C_2$. In particular, sector pattern $P(1)$ has roughly similar coverage as the group $[T(1), T(2), T(3), T(4)]$, while sector pattern $P(2)$ has roughly similar coverage as the group $[T(5), T(6), T(7), T(8)]$.

In some embodiments, each sector in the sector codebook is associated with a group of beams in the beam codebook, the group of beams collectively having similar coverage to that of the sector. For example, the number of candidate beamforming vectors for the transmitter, $N_1$, can be expressed as $N_1 = D_1 \times F_1$, where $D_1$ is the size of the transmitter sector codebook, which can be represented as $P(1), \ldots, P(D_1)$, and $F_1$ is a group size. For antenna training purpose, two codebooks are maintained, where a first codebook is a sector codebook containing $P(i)$, $i=1, \ldots, D_1$ and a second codebook is a beam codebook containing $T(i)$, $i=1, \ldots, N_1$. In general, the sector pattern $P(i)$, $i=1, \ldots, D_1$, may have similar coverage as the group $[T((i-1) \times F_1 + 1), \ldots, T(i \times F_1)]$. As mentioned above, in some embodiments, the group of beam patterns $[T((i-1) \times F_1 + 1), \ldots, T(i \times F_1)]$ can be viewed as a finer representation of $P(i)$. Still other methods and criteria could be used in the design of the beamformer codebooks in multiple levels. For example, the antenna weights for a sector pattern which corresponds to a group of beam patterns may be formed by summing the antenna weights for the beam patterns. The antenna weights for the sector pattern may be further processed by, for example, normalizing the resulting the sum.

Construction of the two-level beamformer codebook for the transmitter was discussed above. A two-level beamformer codebook may be constructed for the receiver following the same principle.

| Receiver sector codebook | Receiver beam codebook |
| --- | --- |
| $Q(1)$ | $[R(1), \ldots, R(F_2)]$ |
| $Q(2)$ | $[R(F_2 + 1), \ldots, R(2 \times F_2)]$ |
| $\ldots$ | $\ldots$ |
| $Q(D_2)$ | $[R(N_2 - F_2 + 1), \ldots, R(N_2)]$ |

An example is shown in the above table, where $[Q(1), \ldots, Q(D_2)]$ forms the receiver sector codebook, with $D_2$ being the codebook size and $F_2$ being the group size, and $[R(1), \ldots, R(N_2)]$ forms the receiver beam codebook with $N_2 = D_2 \times F_2$. In some embodiments, the beamformer $Q(i)$ has similar coverage as the group $[R((i-1) \times F_2 + 1), \ldots, R(i \times F_2)]$, for $i=1, \ldots, D_2$.

It is envisioned that $N_1$ and $N_2$ may be of different size. Similarly, it is possible that $D_1$ and $D_2$ may be of different size and $F_1$ and $F_2$ may be different. It is also possible that these numbers are the same for certain embodiments. It is also envisioned that the group size for each sector may be different. For example, $Q(1)$ may have similar coverage with $R(1), \ldots, R(F_2)$ collectively, where the group size is $F_2$, while $Q(2)$ may have similar coverage with $R(F_2+1), \ldots, R(F_2+F_3)$ where the group size is $F_3$, and $F_2$ may be different than $F_3$. This applies to the transmitter codebooks and to the receiver codebooks. One direct outcome is that the group size $(F_1, F_2, F_3 \ldots)$ may not be a factor of $N_1$, or $N_2$.

Figure 5:
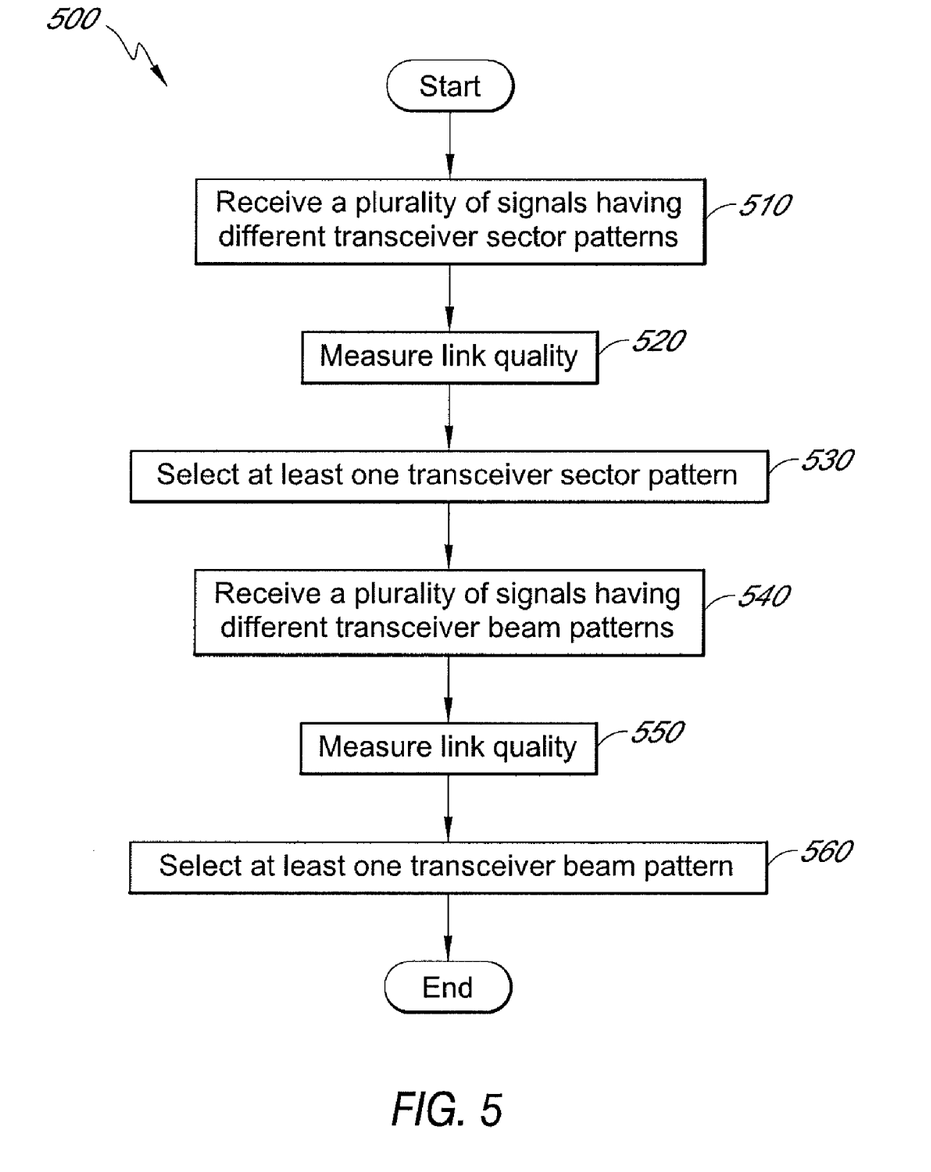
FIG. 5 is a flowchart illustrating a method of acquiring a beam pattern, according to one embodiment.

Selection of the weights for the transmitter or receiver beamformer of a communications system may be performed by searching over the above-described codebook, or a different set of codebooks. FIG. 5 is a flowchart illustrating a method of selecting a beam pattern. The process 500 begins, in block 510, with the reception of a plurality of signals having different transceiver sector patterns.

In some embodiments, an exhaustive search over the $D_1 \times D_2$ sector pattern pairs is performed. For example, with respect to the codebooks shown in FIG. 4, a signal is received with transceiver patterns which may be notated $[P(1) Q(1)]$, $[P(1) Q(2)]$, $[P(2) Q(1)]$, and $[P(2) Q(2)]$. Thus, for this example, an exhaustive search over sector patterns includes receiving four sector training signals.

For each signal received, or a subset thereof, in block 520, an indicator of link quality is measured. In general, a subset may include only one element of the set, at least two elements of the set, at least three elements of the set, a significant portion (e.g. at least 10%, 20%, 30%) of the elements of the set, a majority of the elements of the set, nearly all (e.g., at least 80%, 90%, 95%) of the elements of the set, or all of the elements of the set. The indicators of link quality may correspond to what those skilled in the art denote a link quality indicator (LQI) and/or may comprise signal-to-noise ratio (SNR), signal-to-interference-plus-noise ratio (SINR), bit error rate (BER), packet error rate (PER), received signal strength indication (RSSI), or any other indicator of signal, channel, or link quality available to those skilled in the art.

Measuring an indicator of link quality, or indeed any of the steps of methods or algorithm described in connection with the embodiments disclosed herein, may be embodied directly in hardware, in a software module executed by a processor, or in a combination of the two. A software module may reside in, for example, RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or in any suitable commercially available chipset.

In block 530, at least one transceiver sector pattern is selected. In certain embodiments, the selection is based on the indicators of link quality measured in block 520. In one embodiment, the transceiver sector pattern corresponding to the best link is selected. In some embodiments, other not-quite-as-good sector patterns may also be selected and stored for use in a beam tracking algorithm as will be described in greater detail later. Signals indicative of the selected transceiver beam pattern may be stored or transmitted. For example, if the transceiver sector pattern includes a transmitter sector pattern, the selected transmitter sector pattern may be communicated to the transmitter. In general, a subset of the transceiver sector patterns is selected, and a subset thereof may be stored, transmitted, and/or used for data communication.

In block 540, a plurality of signals having different transceiver beam patterns are received. In one embodiment, the transceiver beam patterns are those associated with the transceiver sector patterns selected in block 530. For example, if the transceiver pattern of [P(1) Q(2)] has been selected, signals are received corresponding to the transceiver beam patterns having transmitter beam patterns of T(1), T(2), T(3), or T(4) and receiver beam patterns of R(5), R(6), R(7), or R(8). In some embodiments, an exhaustive search of the $F_1 \times F_2$ beam pattern pairs is performed.

Using, for example, the process described above with respect to block 520, an indicator of link quality is measured, in block 550, for a subset of the received signals. In block 560, at least one transceiver beam pattern is selected. In some embodiments, the selection of the beam patterns is based on the measured indicators. For example, the transceiver beam pattern corresponding to the link with the highest indicator of link quality may be selected. Data may then be robustly communicated between the transmitter and receiver over the link using the selected transceiver beam pattern. In some embodiments, other not-quite-as-good beam patterns may also be selected and stored for use in a beam tracking algorithm as will be described in greater detail later. Signals indicative of the selected transceiver beam pattern may be stored or transmitted. For example, if the transceiver beam pattern includes a transmitter beam pattern, the selected transmitter beam pattern may be communicated to the transmitter. In general, a subset of the transceiver beam patterns is selected, and a subset thereof may be stored, transmitted, and/or used for data communication.

As described above, the amount of overhead to exhaustively search every transmitter/receiver beamforming pattern pair is related to $N_1 \times N_2 \times T$. Similarly, the overhead for an exhaustive search over all transmitter/receiver sector pattern pairs is related to $D_1 \times D_2 \times T$, and the overhead for an exhaustive search of the beam pattern pairs associated with one transmitter/receiver sector pattern pair is related to $F_1 \times F_2 \times T$. For example, if an exhaustive search is performed over the sector pattern pairs, $N_{cand}$ sector pattern pairs are selected, and an exhaustive search over the associated beam pattern pairs is performed, the overall overhead is related to related to $$[D_1 \times D_2 + F_1 \times F_2 \times N_{cand}] \times T$$

with $N_{cand}$ being one to three, in some embodiments. In other embodiments, $N_{cand}$ is larger than three, such as is true in some embodiments where $N_{cand}$ is between five and seven. On the other hand, the overall overhead for the brute force antenna training is related to $$N_1 \times N_2 \times T = D_1 \times D_2 \times F_1 \times F_2 \times T.$$

By using the two-stage antenna training method, the training overhead (and the associated complexity) may be greatly reduced. In fact, by choosing $D_1$ and $D_2$ and by choosing $F_1$ and $F_2$ on the order of the square root of $N_1$ and $N_2$ respectively, the overall overhead is reduced roughly to the square root of the original overhead. For example, if $N_1$ and $N_2$ are both 36, and $D_1$, $D_2$, $F_1$, and $F_2$ are 6, the overall overhead is reduced from the order of 1296 to the order of 72 if $N_{cand}$ is 1, to the order of 108 if $N_{cand}$ is 2, and to the order of 144 if $N_{cand}$ is 3. An overhead reduction of at least 9 times is achieved.

A two-stage antenna training method has been disclosed above, however, a three-stage, four-stage, etc. training method could be implemented using similar procedures. For example, there may be a third-level beamformer codebook with a number of patterns having a finer resolution than the beam patterns of the second level. Such patterns may be designated sub-beam patterns, or pin patterns. As another example, there may be a third-level beamformer codebook with a number of patterns having a courser resolution than the sector patterns of the first level. Such patterns may be designated super-sector patterns or quasi-omni patterns. Further, the number of levels for the transmitter and receiver may differ. So, too, may the order in which each level is traversed.

List Based Antenna Tracking

In some embodiments, antenna training (either the conventional brute force search or a multi-stage search) introduces the issue that if the channel experiences slow, small changes, the complete antenna training has to be performed again to track these changes.

In some embodiments, an antenna tracking method is used to track the slow, small channel changes so that only partial antenna training (compared to complete antenna training) is performed. One benefit of partial antenna training (or antenna tracking) is that the induced overhead is much smaller than complete antenna training. As mentioned above, selecting the weights of the beamformer can be done in a number of ways, including adaptive training or through selection of weight sets from a codebook. Although this was mentioned in the context of antenna training, it is also true in the context of antenna tracking. Thus, antenna tracking can be performed adaptively or through use a list of candidate beamforming vectors. A list-based antenna tracking method is disclosed herein.

To perform the list-based antenna training, in some embodiments, a list of the best candidate transceiver patterns is maintained after each antenna training procedure is performed. For example, if at the output of the antenna training protocol, the best candidate transmitter/receiver beamforming vector is $[v_1 w_1]$ then in some embodiments, $v_1$ is fed back to transmitter, and data communications may begin with $v_1$ and $w_1$ being the transmitter and receiver beamforming vectors. The transceiver pattern $[v_1\ w_1]$ may, for example, be $[T(2)\ R(6)]$ from the codebook shown in FIG. 4.

In another embodiment, utilizing the list-based antenna tracking, however, not only is the best candidate $[v_1\ w_1]$ generated, but also a list of the other best candidates, e.g., the second best, the third best, the fourth best, and so on is maintained. The list may be formed as $$[v_2\ w_2]$$
$$[v_3\ w_3]$$
$$[v_4\ w_4]$$
$$...$$
$$[v_n\ w_N]$$

with $v_2 \ldots v_n$ and $w_2 \ldots w_n$ being the candidate transmitter and receiver beamforming vectors chosen. At the same time that $v_1$ is fed back to the transmitter, $v_2, v_3, \ldots, v_n$ may also be fed back to the transmitter.

Thus, once the channel experiences slow small changes, instead of running the complete antenna training procedure again, and performing a brute search over every possible beamforming vector or a multi-stage antenna training procedure, in some embodiments, a search is only performed over the list of best candidates to update the transmit and receive beamforming vector.

Figure 6:
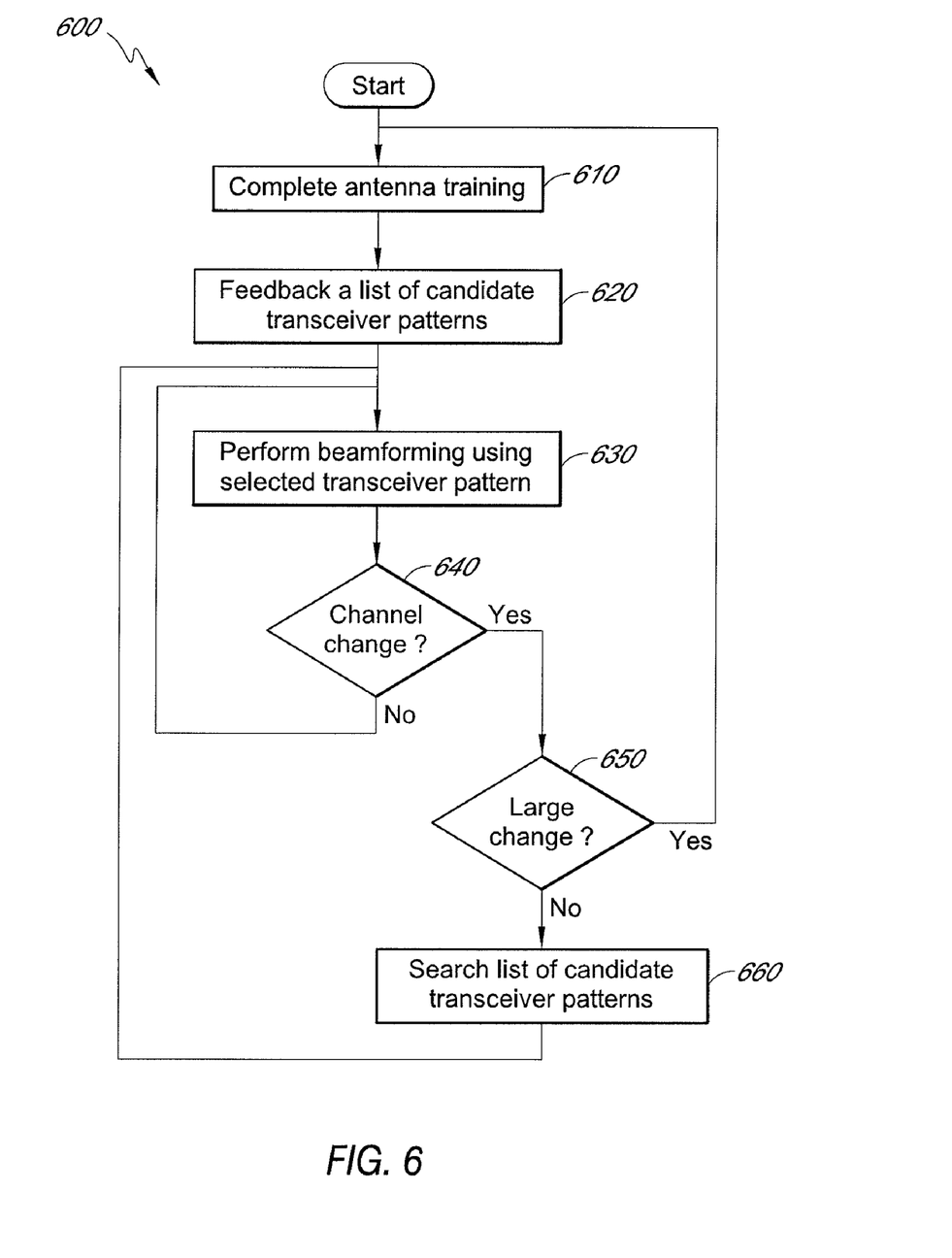
FIG. 6 is a flowchart illustrating a method of beam tracking.

FIG. 6 is a flowchart illustrating a method of beam tracking. The process 600 begins, in block 610, with the completion of an antenna training procedure. The antenna training procedure may, for example, be the procedure 500, illustrated in FIG. 5. Alternatively, the training procedure may be a different multi-stage antenna training procedure or a brute force training procedure.

In block 620, a list of candidate transceiver patterns are fed back to the transmitter. In some embodiments, the candidate transceiver patterns include only a transmitter pattern, whereas in other embodiments, the candidate transceiver patterns include both a transmitter pattern and a receiver pattern. In such embodiments, feeding back the receiver pattern portion of the transceiver patterns is optional.

In block 630, beamforming is performed using a selected transceiver pattern. Data communication may be performed over the link established using the selected transceiver pattern. Communication and/or beamforming continues until it is determined, in block 640, that the channel has changed. Such determination may be performed by measuring an indicator of link quality during communication. For example, it may be determined that the channel has changed when the signal-to-noise ratio drops. It is further determined, in block 650, if the channel change is a significant change. A channel change may be considered significant if, among other things, it is determined that an antenna tracking procedure is likely to fail to converge, if an antenna tracking procedure has failed to converge, if it is determined that it is likely that an antenna tracking procedure would introduce more overhead than an antenna training procedure, or if an antenna tracking procedure has been pending for more than a predetermined amount of time. If so, the procedure returns to block 610 to await the completion of an antenna training procedure.

If the channel has changed, but not changed significantly, the process moves to block 660, where a search is performed over the list of candidate transceiver patterns to attempt to improve the link quality. Once a new best transceiver pattern has been selected based on searching the list of candidate transceiver patterns, the process returns to block 630 where beamforming is performed using the newly selected transceiver pattern.

In other embodiments, candidate transceiver patterns are not fed back, however, beam tracking is performed by searching the beams within the sector which had already been chosen. In multi-stage embodiments with more than two stages, the system may use the beamforming pattern described by the vector $[(a,b,c), (x,y,z)]$, where a is the index of the sector chosen for the transmitter, b is the index of the beam chosen for the transmitter, c is the index of the pin chosen for the transmitter, x is index of the sector chosen for the receiver, y is the index of the beam chosen for the receiver, and z is the index of the pin chosen for the receiver. In another embodiment of a beam tracking procedure, the system, which once used the beamforming pattern described by $[(a,b,c), (x,y,z)]$ will search other pins using the same sector and beam, e.g. $[(a,b,i), (x,y,j)]$ for all i and j. If this fails to produce a beam pattern with a performance metric (such as an indicator of link quality) exceeding some threshold, the system will search other beams using the same sector, .e.g. $[(a,m), (b,n)]$ for all m and n. If a suitable beam is found, that beam may be selected and the searching for an appropriate pin may commence. If a suitable beam is not found, the beam tracking procedure has failed and a complete pattern search may be performed beginning at the sector level.

A beam tracking procedure which may incorporate some of the inventive aspects disclosed herein is discussed in U.S. patent application Ser. No. 11/864,707, entitled "System and method for wireless communication of uncompressed high definition video data using a beamforming acquisition protocol," filed Sep. 28, 2007, the entirety of which is herein incorporated by reference.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of acquiring a beamforming pattern in a wireless communication system, the method comprising:
    receiving a first plurality of signals having different transceiver sector patterns;
    measuring first indicators of link quality corresponding to the first plurality of signals;
    selecting at least one transceiver sector pattern based on the first indicators of link quality;
    transmitting a first selection signal comprising data indicative of the selected at least one transceiver sector pattern;

receiving a second plurality of signals having different transceiver beam patterns, each transceiver beam pattern associated with the selected at least one transceiver sector pattern;

measuring second indicators of link quality corresponding to the second plurality of signals; and selecting at least one transceiver beam pattern based on the second indicators of link quality, wherein the selected at least one transceiver sector pattern is associated with a sector codebook and the selected at least one transceiver beam pattern is associated with a beam codebook.

2. The method of claim 1, wherein the transceiver sector pattern comprises a transmitter sector pattern, a receiver sector pattern, or both a transmitter sector pattern and a receiver sector pattern, and wherein the transceiver beam pattern comprises a transmitter beam pattern, a receiver beam pattern, or both a transmitter beam pattern and a receiver beam pattern.

3. The method of claim 1, wherein the first plurality of signals comprises signals corresponding to each transceiver pattern.

4. The method of claim 1, wherein the indicators of link quality comprise at least one of an indicator of signal-to-noise ratio (SNR), signal-to-interference-plus-noise ratio (SINR), bit error rate (BER), packet error rate (PER), or receiver signal strength indication (RSSI).

5. The method of claim 1, wherein selecting at least one transceiver sector pattern comprises selecting the transmitter and receiver sector pattern yielding the highest signal-to-noise ratio.

6. The method of claim 1, further comprising transmitting a second selection signal comprising data indicative of the selected at least one transceiver beam pattern.

7. The method of claim 1, further comprising receiving a signal having the selected transceiver beam pattern indicative of data.

8. The method of claim 7, wherein the data is audio or video data.

9. The method of claim 8, wherein the data is uncompressed high definitional data.

10. The method of claim 1, further comprising, prior to receiving the first plurality of signals, receiving a third plurality of signals having different transceiver quasi-omni patterns; measuring third indicators of link quality corresponding to the third plurality of signals; and selecting at least one transceiver quasi-omni pattern based on the third indicators of link quality.

11. The method of claim 1, further comprising: receiving a third plurality of signals having different transceiver pin patterns each transceiver pin pattern associated with the selected at least one transceiver beam pattern; measuring third indicators of link quality corresponding to the third plurality of signals; and selecting at least one transceiver pin pattern based on the first indicators of link quality.

12. The method of claim 1, wherein the sector codebook has a coarser resolution than the beam codebook.

13. The method of claim 12, wherein each sector in the sector codebook is associated with a group of beams in the beam codebook, the group of beams collectively having coverage equal to that of the sector.

14. A method of acquiring a beamforming pattern, the method comprising:
transmitting a first plurality of signals having different transmitter sector patterns;
receiving a first selection signal indicative of a selection of at least one transceiver sector pattern;
transmitting a second plurality of signals having different transmitter beam patterns, each transceiver beam pattern associated with the selected at least one transceiver sector pattern; and
receiving a second selection signal indicative of a selection of at least one transceiver beam pattern,
wherein the selected at least one transceiver sector pattern is associated with a sector codebook and the selected at least one transceiver beam pattern is associated with a beam codebook.

15. The method of claim 14, wherein the first plurality of signals comprises a plurality of signals having the same transmitter sector pattern.

16. The method of claim 14, wherein the first selection signal is indicative of at least one transceiver sector pattern comprising a transmitter sector pattern or both a transmitter sector pattern and a receiver sector pattern, and wherein the second selection signal is indicative of at least one transceiver beam pattern comprising a transmitter beam pattern or both a transmitter beam pattern and a receiver beam pattern.

17. The method of claim 14, further comprising transmitting data having a transmitter beam pattern based on the second selection signal.

18. A system for acquiring a beamforming pattern in a wireless communication system, the system comprising:
a receiver configured to receive a first plurality of signals having different transceiver sector patterns;
a measuring module configured to measure first indicators of link quality corresponding to the first plurality of signals; and
a selecting module configured to select at least one transceiver sector pattern based on the first indicators of link quality; and
a transmitter configured to transmit a first selection signal comprising data indicative of the selected at least one transceiver sector pattern;
wherein the receiver is further configured to receive a second plurality of signals having different transceiver beam patterns, each transceiver beam pattern associated with the selected at least one transceiver sector pattern;
wherein the measuring module is further configured to measure second indicators of link quality corresponding to the second plurality of signals;
wherein the selecting module is further configured to select at least one transceiver beam pattern based on the second indicators of link quality; and
wherein the selected at least one transceiver sector pattern is associated with a sector codebook and the selected at least one transceiver beam pattern is associated with a beam codebook.

19. The system of claim 18, wherein the receiver comprises a sectorized/switched antenna array or a phased antenna array.

20. The system of claim 18, further comprising a memory configured to store at least the first indicators of link quality, the selected transceiver sector patterns, the second indicators of link quality, or the selected transceiver beam patterns.

21. A system for acquiring a beamforming pattern in a wireless communication system, the system comprising:
a transmitter configured to transmit a first plurality of signals having different transmitter sector patterns; and
a receiver configured to receive a first selection signal indicative of a selection of at least one transceiver sector pattern;
wherein the transmitter is further configured to transmit a second plurality of signals having different transmitter beam patterns, each transceiver beam pattern associated with the selected at least one transceiver sector pattern;

wherein the receiver is further configured to receive a second selection signal indicative of a selection of at least one transceiver beam pattern; and wherein the selected at least one transceiver sector pattern is associated with a sector codebook and the selected at least one transceiver beam pattern is associated with a beam codebook.

22. The system of claim 21, wherein the transmitter and receiver both comprise an antenna.

23. The system of claim 22, wherein the antenna is a sectorized/switched antenna array or a phased antenna array.

24. The system of claim 21, further comprising a memory configured to store at least the selected transceiver beam patterns.

25. A method of acquiring a beamforming pattern in a wireless communication system, the method comprising:

determining a plurality of transceiver beam patterns, including a first transceiver beam pattern associated with a first codebook;

receiving a signal having the first transceiver beam pattern indicative of data;

detecting a channel change;

receiving, after detecting a channel change, a plurality of signals having the plurality of transceiver beam patterns;

selecting a transceiver beam pattern from a plurality of said transceiver beam patterns based on the measures of link quality, wherein the selected transceiver beam pattern is associated with a second codebook.

26. The method of claim 25, wherein determining a plurality of transceiver beam patterns comprising performing a beamforming acquisition procedure.

27. The method of claim 25, further comprising, prior to receiving the plurality of signals, transmitting a detection signal comprising data indicative of the detection of a channel change.

28. A method of acquiring a beamforming pattern, the method comprising:

determining a plurality of transceiver beam patterns, including a first transceiver beam pattern associated with a first codebook;

transmitting a signal having the first transceiver beam pattern indicative of data;

transmitting a plurality of signals having the plurality of transmitter beam patterns; receiving a selection signal indicative of a selection of a transceiver beam pattern from the plurality of transceiver beam patterns, wherein the selected transceiver beam pattern is associated with a second codebook.

29. The method of claim 28, wherein determining a plurality of transceiver beam patterns comprises performing a beamforming acquisition procedure.

30. The method of claim 28, wherein detecting a channel change comprises receiving a signal comprising data indicative of a detection of a of channel change.

31. A method of constructing a multi-level codebook, the method comprising:

determining a plurality of transceiver sector patterns;

determining a plurality of transceiver beam patterns, each transceiver beam pattern contained within a transceiver sector pattern; and storing the plurality of transceiver sector patterns and the plurality of first transceiver beam patterns as a multi-level codebook, wherein the transceiver sector patterns are associated with sector codebooks and the transceiver beam patterns are associated with beam codebooks.

32. The method of claim 31, further comprising determining a plurality of transceiver pin patterns, each transceiver pin pattern contained within a transceiver beam pattern.

33. The method of claim 31, further comprising determining a plurality of transceiver quasi-omni patterns, each transceiver second pattern contained within a transceiver quasi-omni pattern.

34. The method of claim 31, wherein the plurality of transceiver sector patterns collectively cover an omni-directional direction.

35. The method of claim 31, wherein the plurality of transceiver beam patterns collectively cover a direction defined by the transceiver sector patterns.

36. The method of claim 31, wherein each transceiver sector pattern is wider in terms of coverage of directions than each transceiver beam pattern.

37. The method of claim 31, wherein two transceiver sector patterns overlap in direction coverage.

38. The method of claim 31, wherein two transceiver beam patterns overlap in direction coverage.

* * * * *